United States Patent
Beadle

(12) 
(10) Patent No.: US 6,491,407 B1
(45) Date of Patent: Dec. 10, 2002

(54) IN-GROUND LIGHTING FIXTURE WITH GIMBALED LAMP ASSEMBLY

(76) Inventor: Joshua Beadle, 5362 Caminito Vista Lujo, San Diego, CA (US) 92130

( * ) Notice: Subject to any disclaimer, the term of this patent is extended or adjusted under 35 U.S.C. 154(b) by 22 days.

(21) Appl. No.: 09/656,813

(22) Filed: Sep. 7, 2000

(51) Int. Cl.[7] .................................................. F21S 8/02
(52) U.S. Cl. ...................... 362/153; 362/270; 362/364; 362/372
(58) Field of Search ................................ 362/153, 145, 362/364, 365, 366, 372, 148, 149, 153.1, 158, 323, 270

(56) References Cited

U.S. PATENT DOCUMENTS

| | | | |
|---|---|---|---|
| 4,180,850 A | | 12/1979 | Bivens |
| 5,003,441 A | | 3/1991 | Crowe |
| 5,072,345 A | | 12/1991 | Goggia |
| 5,156,454 A | * | 10/1992 | White ......................... 362/153 |
| 5,230,559 A | | 7/1993 | Porter |
| 5,408,397 A | * | 4/1995 | Tyson ......................... 362/267 |
| 5,414,607 A | | 5/1995 | Harris |
| 5,481,443 A | * | 1/1996 | Wagner et al. ............ 362/153.1 |
| 5,486,988 A | * | 1/1996 | Tyson ......................... 362/267 |
| 5,727,873 A | * | 3/1998 | Tyson ......................... 362/294 |
| 5,743,622 A | * | 4/1998 | Ibbitson et al. .......... 362/153.1 |
| 5,908,236 A | * | 6/1999 | Lueken et al. .............. 362/364 |
| 6,106,134 A | * | 8/2000 | Bomas ..................... 362/153.1 |

* cited by examiner

Primary Examiner—Sandra O'Shea
Assistant Examiner—Ismael Negron
(74) Attorney, Agent, or Firm—Eleanor M. Musick; Kilpatrick Stockton LLP

(57) ABSTRACT

The in-ground, or "well light", fixture comprises a hollow cylindrical housing, a bezel and lens mounted at the upper end of the housing, and a lamp assembly comprising a watertight lamp enclosure containing a lamp and reflector. The lamp enclosure is secured by support brackets which extend downward from the bottom portion of the bezel to provide three-axis adjustability of the lamp. An optional mounting ring is attached at the upper end of the housing to form a flange to facilitate stable placement of the well light in the ground as well as providing an attractive frame around the fixture. The lens is retained at a shallow angle within the bezel to permit water and dirt to run off of the lens surface.

23 Claims, 4 Drawing Sheets

IN-GROUND LIGHTING FIXTURE WITH GIMBALED LAMP ASSEMBLY

FIELD OF THE INVENTION

The present invention relates to lighting fixtures adapted for landscape and environmental lighting applications and, more particularly, to in-, or below-ground lighting fixtures.

BACKGROUND OF THE INVENTION

The use of outdoor lighting fixtures has become increasingly popular for illuminating buildings, gardens, pathways and entrance ways as the nighttime play of light on the landscape and vegetation is aesthetically pleasing. Additionally, such lighting provides enhanced security by eliminating hiding places and unobserved entry points for intruders. Outdoor lighting systems include one or more lighting fixtures which are connected to either a 12 V transformer or a standard 120 VAC line. The lighting fixtures generally include a housing, a lamp assembly having a halogen or conventional bulb and a reflector, and a lens or window. Many configurations are known for providing a variety of different lighting effects.

Landscape lighting fixtures, most of which are mounted at or above ground level are generally considered to appear somewhat incongruous with the surrounding vegetation during daylight hours, when the illumination function is not in use. Further, because of the constant exposure to the elements, above ground lighting fixtures are generally required to be made of expensive, high quality materials, such as non-corrosive metal alloys, in order to provide durability and a reasonable resistance to damage so as not to appear cheap and unkempt.

As an alternative to the above-ground placement of landscape lighting fixtures, recessed, in-ground lighting fixtures, also known as "well lights", have gained widespread acceptance. In certain applications, the use of below-ground landscape lighting is preferable over above-ground varieties, especially in areas surrounding walkways where an above-ground element could poses a tripping hazard or in lawn areas where the use of a lawn mower presents a risk of damage to the fixture.

Despite having a number of advantages over above-ground type fixtures for certain applications, in-ground light fixtures encounter problems not typically seen in lighting fixtures of other varieties. A significant problem is the intrusion of water or other electrically conductive fluids into the subterranean receptacle housing the lighting fixture. A number of sealing techniques have been employed in the prior art. In the in-ground light fixture of Wagner, et al., U.S. Pat. No. 5,481,443, a single sealing element between the lens and the fixture housing is relied upon to provide a barrier against moisture intrusion. The U.S. Pat. No. 5,003,441 of Crowe, et al., which discloses an in-ground pop-up light fixture, makes passing mention to "the lower housing is normally sealed watertight" but fails to disclose the means by which the seal is created. The well light of Porter, et al., U.S. Pat. No. 5,230,559, makes no provision for ensuring water resistance of the lighting fixture and attached wiring. The need for water resistance is of additional importance to in-ground fixtures since the light emitting surface is usually horizontal, providing a place for water to pool and increasing the chance of water-related damage. In addition, in such fixtures, the water can "wick" up the field wire into the fixture housing, thus imposing the need for the fixture to be water-tight from all perspectives.

A second problem experienced with below-ground light fixtures is the need to control the direction of illumination with maximum efficiency and ease for the user. A significant limitation is that the lamp is located at or below ground surface, which limits the range of illumination and convenient access to the lamp. It would be an advantage to have an apparatus where the lamp is easily accessible to the user for adjustment of beam quality and direction without compromising the water tightness or weather resistant features of the fixture.

A third, seldom addressed problem is a means for cooling the in-ground lighting fixture. Halogen and incandescent filaments generate a significant amount of radiant heat when illuminated. Being placed in-ground, the lighting fixture has limited means for providing air circulation to dissipate heat build-up within the fixture which can potentially lead to failure of the fixture due to damaged or melted components and electrical wiring as well as accelerating corrosion due to the exposure to outdoor environments. Furthermore, minerals and other residue deposited on the lens as the result of irrigation and other environmental exposure are baked on by the heat generated by the lamp. The baked-on residue obscures light output and exacerbates the tendency for heat build-up.

It would be desirable to provide an in-ground lighting fixture that provides a watertight interior environment for electrical wiring and associated elements while allowing for adjustability of the light beam. An additional cooling means for the lighting element would also be desirable. These problems and deficiencies are clearly felt in the art and are solved by the present invention in the manner described below.

SUMMARY OF THE INVENTION

It is an advantage of the present invention to provide an in-ground lighting fixture that is water-tight.

It is a further advantage of the present invention to provide an in-ground lighting fixture that allows multi-axis adjustment of the beam.

Another advantage of the present invention is to provide an in-ground lighting fixture that has means for cooling and providing air circulation for the below-ground portion of the fixture.

Still another advantage of the invention is to provide an in-ground lighting fixture that minimizes build-up on the lens that can occur from exposure of the fixture to water and dirt.

In an exemplary embodiment, the in-ground, or "well light", fixture comprises a hollow cylindrical housing, a bezel and lens mounted at the upper end of the housing, and a lamp assembly comprising a watertight lamp enclosure containing a lamp and reflector. The lamp enclosure is secured by support brackets which extend downward from the bottom portion of the bezel to provide three-axis adjustability of the lamp. An optional mounting ring is attached at the upper end of the housing to form a flange to facilitate stable placement of the well light in the ground as well as providing an attractive frame around the fixture. The lens is retained at a shallow angle within the bezel to permit water and dirt to run off of the lens surface.

The bezel comprises a circular plate that has top and bottom portions and an outside diameter that fits within the inside diameter of the mounting ring so that the bezel is supported on top of the upper end of the housing. The bottom portion of the bezel has a first inner diameter sized to fit within the inner diameter of the housing and a second inner diameter larger than the first inner diameter to create a lip adapted to fit over the top edge of the housing. When seated, the upper surface of the bezel is flush with the upper face of the mounting ring. The bezel has a plurality of openings therethrough, including a window opening that is generally rectangular to provide access to a transparent lens that is disposed at a shallow angle relative to horizontal to guide water and dirt away from the lamp assembly, allowing the water to run off the outer edge of the lens without pooling. A plurality of radially-arranged openings provide air circulation into and out of the interior of the housing, keeping the outer lens cool. Both the mounting ring and the bezel can be made from brass, anodized or powder-coated aluminum, or any other material that provides appropriate durability and weather-resistance as well as being aesthetically pleasing.

Retained within the housing is a lamp assembly comprising a shroud portion, a window, and a base portion which enclose a lamp and reflector. A pair of lamp support brackets are provided to mount the lamp assembly to the bottom portion of the bezel. Each bracket has a flanged portion for attachment to the bezel and a straight portion which attaches to the lamp assembly. The brackets are disposed on opposite sides of the lamp base. Axial mounting screws are inserted from either side of the lamp base into threaded bores to hold the lamp assembly in place on the brackets while defining a pivot axis for tilting the lamp at a desired angle. The flanged portion of each bracket has an elongated slot formed therein through which the mounting screws are inserted, allowing the lamp assembly to be moved along a line parallel to the length of the window, then locked in place with the mounting screws. The straight portion of each bracket has an elongated slot formed therein to allow the lamp assembly to be adjusted closer to or farther away from the lens to alter the beam spread, then locked into position by tightening the axial mounting screws. The two sets of elongated slots and the axial mounting screws combine to provide a three-axis gimble mounting that provides maximum aiming flexibility, from near horizontal, e.g., for use in illuminating signs or walls, to vertical, for use lighting, e.g., flagpoles, trees, or overhead structures.

The base portion of the lamp assembly is generally cylindrical with a first end and a second end. A watertight electrical connector sleeve extends through the side of the second end for passing electrical wires from the outside to the interior of the base portion to connect to the socket that holds the lamp. Optional epoxy potting may be used to fill in the bottom interior spacing within the base to further provide stability for the socket and water-proofing for the electrical connectors. The outer surface of the second end has a plurality of annular cooling fins extending therefrom to function as a heat sink to dissipate heat generated by the lamp. The first end of the base is threaded with external ACME screw threads with an O-ring seat formed below the lowest thread. A large gauge O-ring is disposed within the O-ring seat so that the outer diameter of the O-ring is larger than the diameter of the screw threads. A second, smaller gauge O-ring is disposed below the first O-ring, closer to the second end of the base portion, and has an outer diameter that is greater than the outer diameter of the first O-ring.

The shroud portion of the lamp assembly is generally cylindrical with a window end and a base end. The interior of the base end has internal ACME screw threads for mating with the external threads on the base portion. A smooth inner sidewall below the threaded portion contacts the large O-ring to provide a tight fit, while the interior edge of the base end is chamfered to tightly fit against the second smaller O-ring, combining to create a watertight seal between the shroud portion and the base portion. The window end of the shroud portion has a recess formed for receiving the window, or lens, with the outer face of the window flush with the edge of the window end. The window is sealed within the shroud to create a watertight seal using a latex or RTV-silicone sealant or other appropriate sealant.

When an appropriate commercially-available lamp/reflector combination is plugged into the socket in the base portion, sufficient space remains between the upper extent of the reflector and the window to insert filters, diffusers or other optical elements to modify the beam, if desired. A bias spring can be used to provide an upward bias against the reflector to keep the lamp pressed against any optical elements that might be used.

The well light of the present invention provides a highly adjustable recessed fixture that is sufficiently watertight that it can actually be used in underwater applications such as swimming pools, decorative ponds and fountains.

BRIEF DESCRIPTION OF THE DRAWINGS

For a more complete understanding of the present invention, reference is now made to the following detailed description of the embodiments illustrated in the accompanying drawings, wherein.

DETAILED DESCRIPTION OF PREFERRED EMBODIMENTS

Figure 1:
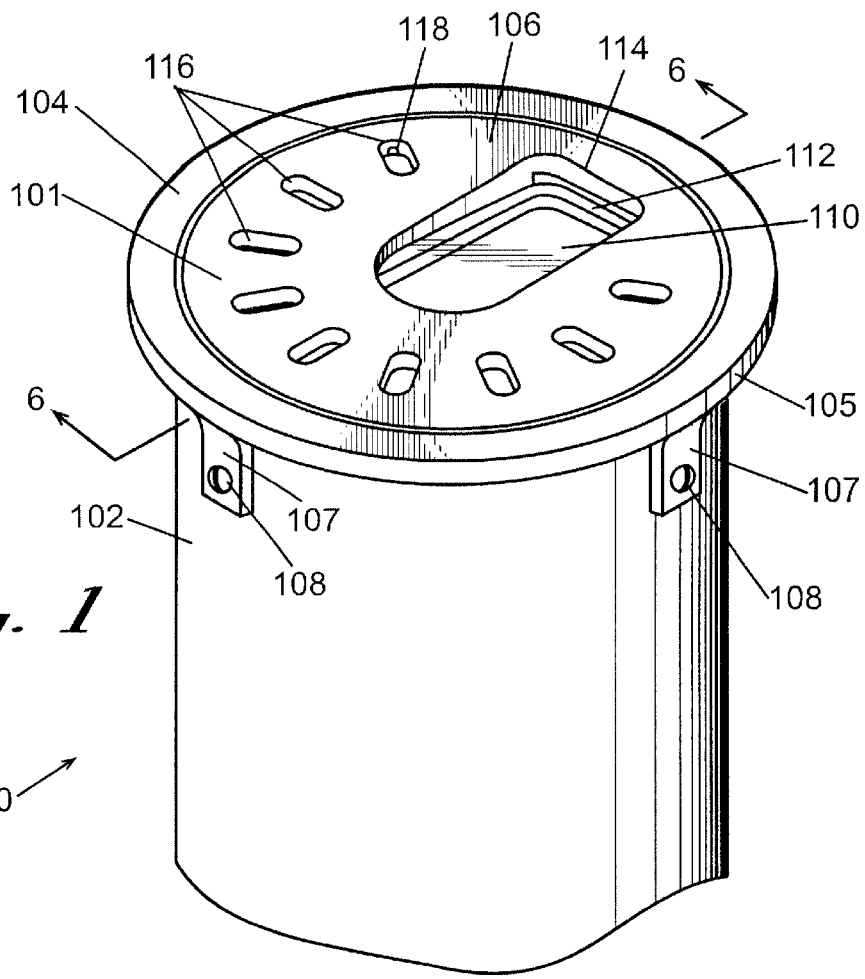
FIG. 1 is a perspective view of the well light unit.
Figure 2:
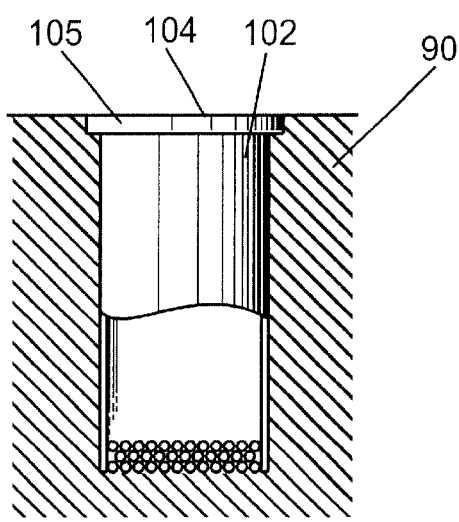
FIG. 2 is a view showing the well light recessed in the ground.

Illustrated in FIG. 1, the in-ground lighting fixture 100 includes cylindrical housing 102 with an upper end, a lower end, an outside diameter and an inside diameter. Housing 102 is formed from a section of commercially-available plastic pipe which, in the preferred embodiment, is a 12 inch (30.5 cm) length of 6 inch (15.2 cm) diameter ABS (acrylonitrile-butadiene-styrene) pipe. Other types of pipe may also be used, including PVC (polyvinyl chloride), CPVC (chlorinated polyvinyl chloride), and similar materials, which are resistant to corrosion and oxidation. As shown in FIG. 2, the lower end of housing 102 remains open to permit drainage into the substrate 92 below the fixture 100. It should be noted that the cylindrical configuration is an exemplary embodiment. The well light fixture of the present invention is not limited to a cylindrical configuration, but may be constructed using a hollow housing of any geometric cross-sectional shape, including, but not limited to square, triangular, pentagonal, etc. Where different shape housings are used, the mounting ring and bezel will generally be shaped accordingly.

Optional mounting ring 104 has an inner diameter that is larger than the outer diameter of housing 102 and is attached at the upper end of housing 102 to form a flange 105 to facilitate stable placement of the well light in the ground 90 (or other surface) as well as providing an attractive frame around the fixture. Mounting ring 104, which is generally formed from brass, anodized or powder-coated aluminum, or other corrosion resistant material, is attached to housing 102 via an opening through each of a plurality of tabs 107 that extend downward from flange 105. Screws 108, rivets, bolts or similar fasteners pass through the tab openings and into a corresponding bore in the side of the housing to affix mounting ring 104 on housing 102.

Bezel 106 is a generally circular plate made of brass, anodized or powder-coated aluminum, or other suitable material, that has a top potion 101 and a bottom portion 109. Top portion 101 has an outer diameter that fits within the inside diameter of mounting ring 104 and is approximately equal to the outer diameter of housing 102. Bottom portion 109, show in FIG. 3, has a second diameter which is smaller than the outer diameter of top portion 101 and fits within the upper end of housing 102. The combination of the two diameters defines a lip portion 96 which sits on top of the upper end of housing 102. When bezel 106 is in place, its upper face is flush with the upper face of mounting ring 104.

Figure 3:
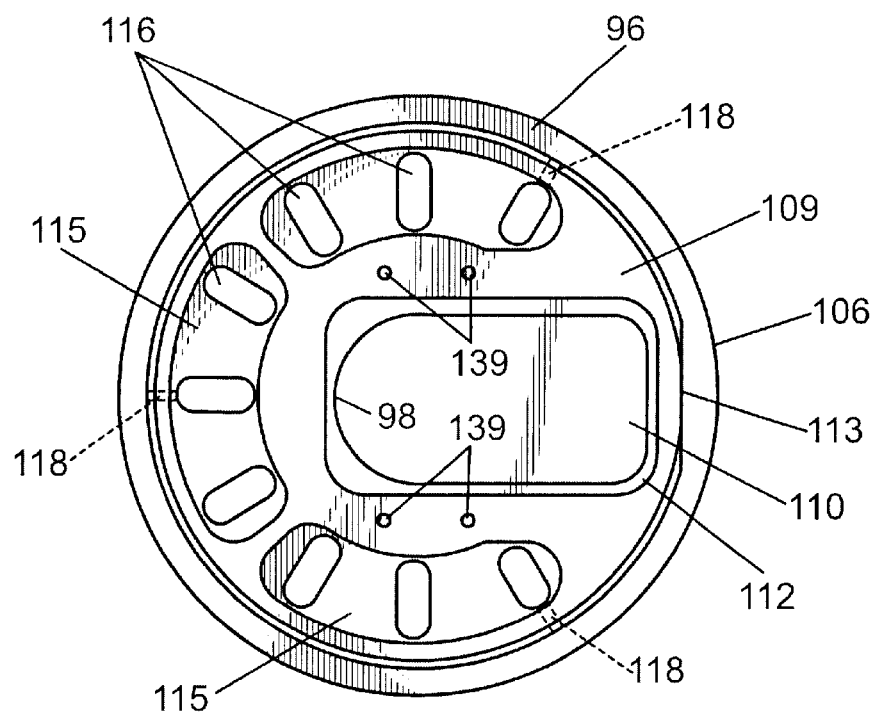
FIG. 3 is an underside view of the top bezel.
Figure 7:
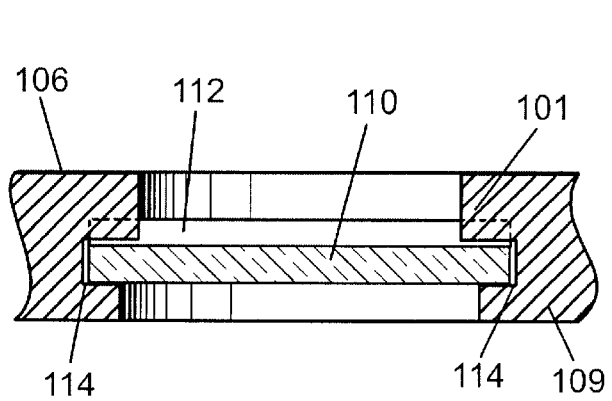
FIG. 7 is a sectional view taken on line 7—7 of FIG. 6.
Figure 6:
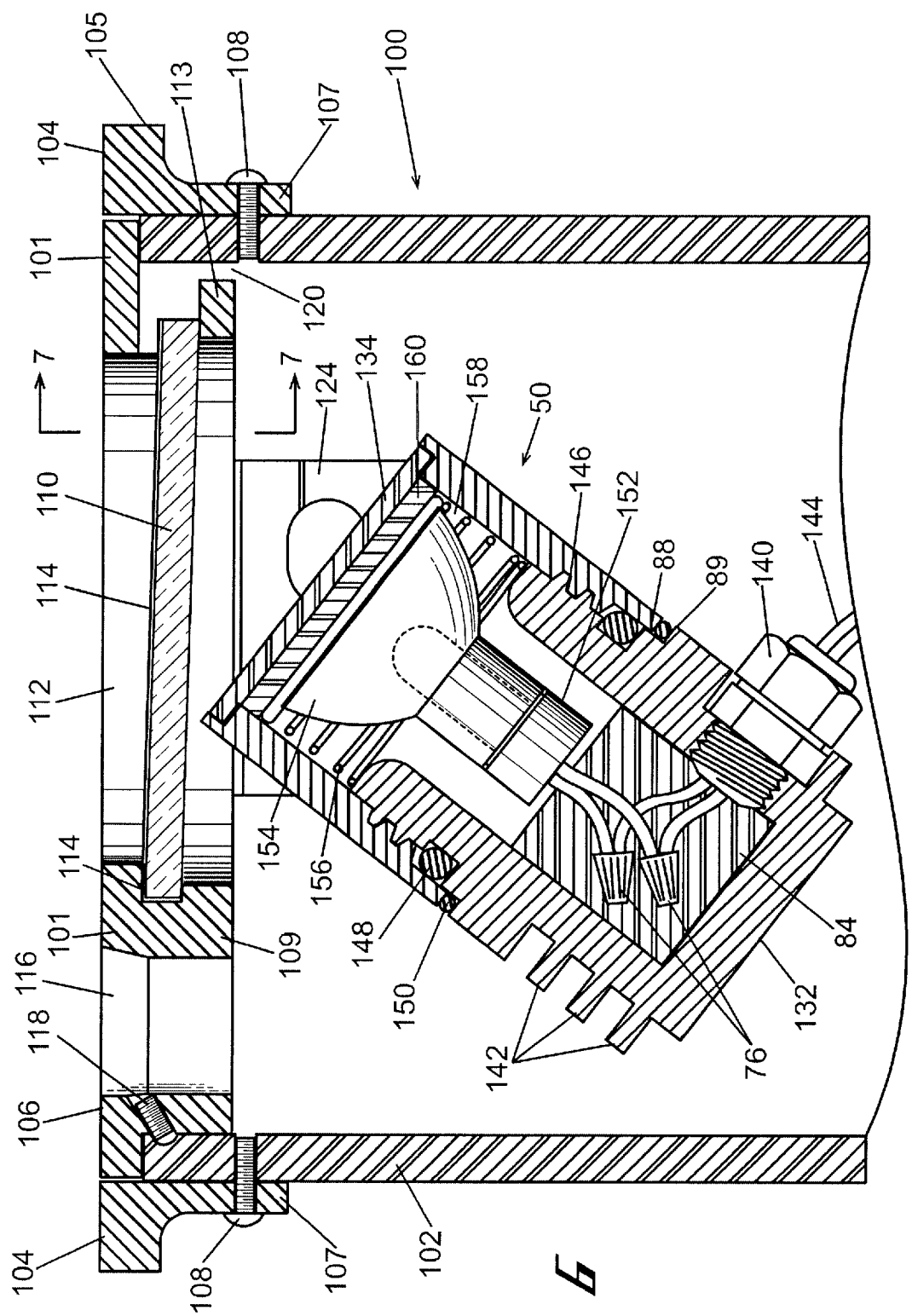
FIG. 6 is an enlarged sectional view taken on line 6—6 of FIG. 1.

As shown in FIG. 1, bezel 106 has a plurality of openings extending through its thickness and comprising a single generally rectangular window opening 112 and a plurality of radially-arranged openings 116. Window opening 112 has a length corresponding to approximately two-thirds of the diameter of bezel 106 and is rounded at the innermost extent 98 on the top portion 101 to facilitate cleaning. When viewed from the bottom, as in FIG. 3, window opening 112 through bottom portion 109 is more rectangular with rounded corners. Bottom portion 109 is of sufficient thickness that channels 114 (seen in FIG. 7) are defined in the sides of window opening 112 to create a slot that extends radially across bottom portion 109 for supporting a transparent lens 110, as shown in FIGS. 6 and 7. Channels 114 along the longs sides of window opening 112 are sloped at a shallow angle downward toward the radial edge of bezel 106 to prevent water and dirt from collecting on the face of lens 110 and to permit the water and dirt to drain away from the lamp assembly 50. A squared-off edge 113 in bottom portion 109, which can be better seen in FIG. 3, provides a drainage opening 120, show in FIG. 6, that permits water and dirt running off of lens 110 to drain away from the lens surface, along the inner sidewall of housing 102, as far as possible from the lamp assembly 50, down to substrate 92. 116 providing means through which air can circulate into and out of the interior of housing 102. Although illustrated as slots with rounded ends, other shapes, such as circles, semi-circles, crescents, or rectangles, can be used. For ease of manufacture, as shown in FIG. 3, bottom portion 109 has a plurality of recessed areas 115 formed therein coinciding with the location of several, in this case, three, openings 116, so that the openings need only be made through the thickness of the top portion 101. The recessed areas 115 also help reduce the weight of bezel 106 without compromising the structural integrity of the fixture. As shown in FIG. 6, threaded bores extend at an angle from the outer edge of several of the openings 116, exiting through the side of bottom portion 109 to permit a screw 118 to be inserted to abut against the inside diameter of housing 102 securing bezel 106 in place. As illustrated in FIG. 3, the exemplary embodiment utilizes three such screws 118, however, any number of such screws can be used.

Figure 4:
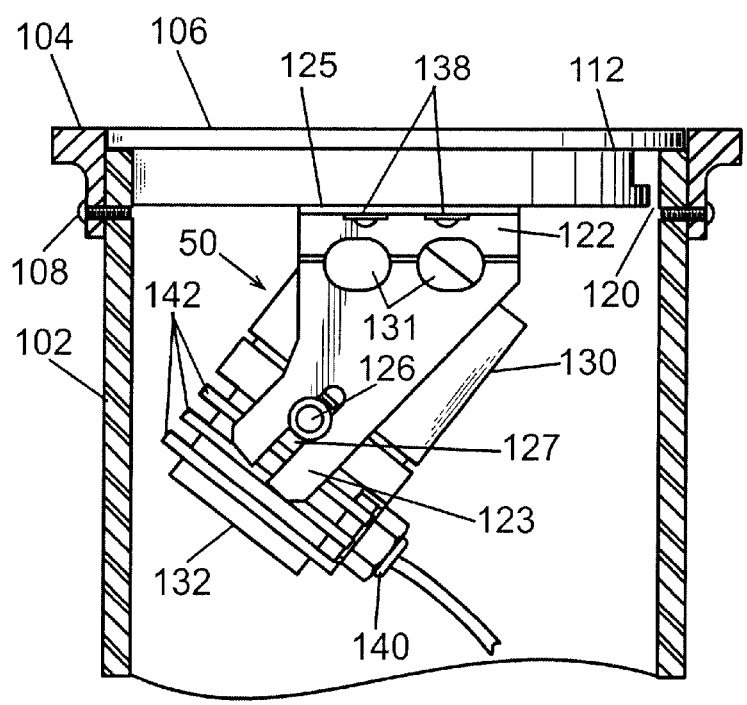
FIG. 4 is a side view of the unit with the outer housing cut away.
Figure 5:
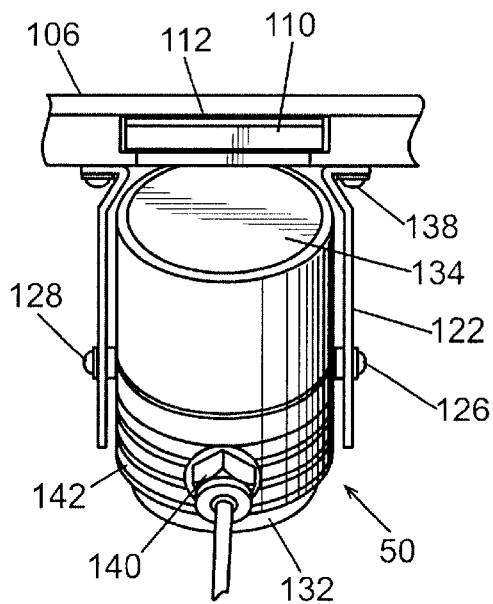
FIG. 5 is a view taken from the right-hand side of FIG. 4.

FIGS. 4 and 5 illustrate the lamp assembly comprising a shroud portion 130 and a base portion 132. Shroud portion 130 is cylindrical in shape and has a lens end for retaining window or lens 134 and a base end which maters with base portion 132. Base portion 132 is also cylindrical in shape having a threaded first end and a second end surface with cooling fins 142 extending therefrom to act as a heat sink to facilitate dissipation of heat generated during operation of the lamp. As illustrated in FIG. 6, heat coming off of cooling finds 142 rises up and out of opening 116. The externally-threaded first end of base portion 132 has a diameter slightly less that the inside diameter of the internally-threaded second end of shroud portion 130 so that base portion 132 fits within shroud portion 130. In a preferred embodiment of the present invention, the externally-threaded first end of base portion 132 and the internally-threaded second end of shroud portion 130 comprise ACME-type threads, known to those of skill in the art, which provide a strong, thick seat capable of functioning smoothly in spite of significant resistance created by the presence of O-ring 148, discussed below. In addition, if the lamp enclosure is to be powder-coated, ACME threads provide the advantage that they are not affected by the build-up of material in the threads. At the first end of base portion 132, below the lowest thread, O-ring seat 88 is formed. At the base end of shroud portion 130, below the threaded portion, a smooth inner sidewall is provided opposite O-ring seat 88 for contact the large O-ring to provide a tight fit. The interior edge of the base end of shroud portion 130 is chamfered to tightly fit against the second smaller O-ring. In the preferred embodiment, each of the shroud portion 130 and base portion 132 are formed from aluminum alloy using CNC machining. The aluminum alloy can be powder-coated or anodized for improved corrosion resistance. Other materials, e.g., brass, stainless steel, PVC or other plastics, and other shaping methods, e.g., molding, die casting, etc., may be used.

Referring to FIG. 6, when assembled, shroud portion 130 and base portion 132 form a watertight enclosure as the result of its multiple O-rings construction. ACME threads 146 allow the base end of shroud portion 130 to be screwed over the large gauge, i.e., thick, O-ring 148 disposed within O-ring seat 88. In the exemplary embodiment, a #328 O-ring (0.210 in.×1.85 in. ID) is used. The outer diameter of the O-ring 148 is larger than the diameter of the screw threads, thus generating significant resistance to the relative rotation of the base and shroud portions during assembly, causing the O-ring 148 to be compressed between the base and shroud portions to provide a watertight seal. Smaller gauge O-ring 150, e.g., 0.0625 in is located in a second O-ring seat 89 below O-ring 148, near the pivot axis. O-ring 150 provides a seal against dirt intrusions as well as assisting in creation of a watertight seal between the shroud portion and the base portion to ensure that all components within the assembled shroud and base portions remain completely dry.

The lens end of shroud portion 130 has a recess formed therein for receiving a window or lens 134 so that the face of the lens is flush with the end of the lens end opening to allow any water that might contact the upper portion of lamp assembly 50 to easily run off. RTV-silicone, latex or epoxy sealant, or similar adhesive, is used to secure lens 134 within the lens end of shroud portion 130, providing a water-tight seal. Lens 134, which is closest to lamp 86, will tend to build up heat, however, according to the present invention, lens 134 is protected from the elements to minimize exposure to detrimental build-up. Lens 110, on the other hand, remains cool due to air circulation within housing 102, drainage via opening 120, and the separation between the top surface of lens 134 and the bottom of lens 110. The combination of lenses avoids the problem that occurs in prior art fixtures from baking residue on a hot lens and also improves the overall safety of the fixture, since there is a significant reduction in the risk of burns from inadvertent contact with the heated surface of the lens.

Housed within the water-tight enclosure of the lamp assembly are lamp socket 152, a lamp 86 and a generally parabolic reflector 154 having a base end and an upper end. Lamp socket 152 is connected to a voltage source via wire 144 extending from the second end of the socket 152 and exiting the lamp assembly through water-tight fitting 140 in base 132 for connection to the voltage supply (not shown). In an exemplary embodiment, water-tight fitting 140 is a Heyco Liquid Tight Fitting # 3458. Selection of appropriate fittings that provide the desired watertight quality is within the level of skill in the art. Additionally, epoxy potting 84 or other appropriate potting material or sealant may be injected into the interior bottom of base portion 132 to provide an additional water-tight barrier. In the preferred embodiment, connector caps 76, or similar connectors, are used to connect wire 144 to wires 74 connected to the electrical conductors of socket 152. This minimizes the risk of wicking of water down the field wire and into the lamp assembly.

The first end of lamp socket 152 retains and provides electrical contact to a lamp 86, which may be a halogen lamp or other suitable lighting means. Socket 152 abuts the base end of reflector 154. As illustrated in FIG. 6, to hold the lamp socket 152 and lamp reflector 154 in a fixed position within lamp assembly 50, a bias spring 156 encircles the perimeter of lamp reflector 154 with its lower portion abutting the upper lip of base portion 132 and its upper portion pressing against reflector 154 to force the upper edge of reflector 154 against the underside of lens 134 to provide stability. Spring 156 is sufficiently compressible to permit one or two 0.125" filters, diffusers or other optical effects, to be inserted between the upper edge of reflector 154 and lens 134. As shown in FIG. 6, a single filter 160 has been inserted within the space between the upper edge of reflector 154 and lens 134.

In the exemplary embodiment, lamp assembly 50 is secured to the lower surface of bezel 106 by a pair of lamp support brackets, designated for descriptive purposes as right support bracket 122 and left support bracket 124, as shown in FIGS. 4 and 5. Right support bracket 122 and left support bracket 124 are disposed on opposite sides of base portion 132, which has a pair of threaded bores disposed therein for receiving axial mounting screws 126 and 128. Mounting screws 126 and 128 are axially aligned and function as a pivot axis for the lamp assembly while holding the lamp assembly between brackets 122 and 124. In an alternate embodiment, a single support bracket, the same as or similar to the described support brackets, can be used on one side of the lamp assembly. Some stability may be lost in a single bracket configuration, however, it may be possible to add another degree of adjustability of the beam angle.

Figure 8:
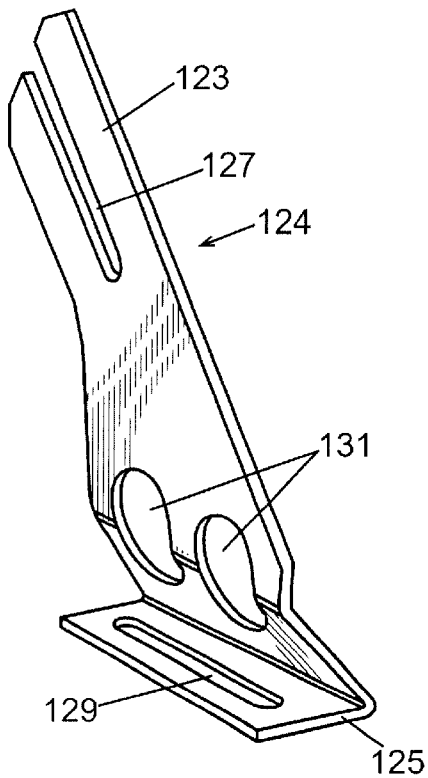
FIG. 8 is a perspective view of one lamp supporting bracket.

As illustrated in FIG. 8, each lamp support bracket 122, 124 has a flanged portion 125 which attaches to the bottom face of bezel 106 and a straight portion 123 which supports the lamp assembly 50.

Straight portion 123 of each bracket has an elongated slot 127 formed therein through which mounting screws 126, 128 pass. Slot 127 is disposed at an angle relative to bezel 106 in a manner that allows the lamp assembly 50 to be moved away from or towards lens 110 while still permitting the beam angle to be adjusted. One or more washers can be placed on mounting screws 126, 128 to allow the screws to be sufficiently tightened to hold the assembly in place while still permitting the pivot angle to be adjusted.

Flanged portion 125 of each bracket has an elongated slot 129 extending along its length through which mounting screws 138 are inserted into threaded bores 139 (shown in FIG. 3) to attach the brackets 122, 124 to bezel 106. Openings 131 in straight portion 123, shown in FIG. 8, facilitate access to mounting screws 138 for adjustment. Slot 129 allows lamp assembly 50 to be moved along a line parallel to the long sides of the window opening 112, providing adjustment of the angle at which light from the lamp impinges upon the underside of lens 110. With lamp assembly 50 positioned so that it is generally concentric with bezel 106, the pivot axis is essentially aligned with the center point of bezel 106 and lamp assembly 50 is tilted at approximately 90° so that light is emitted substantially perpendicular to lens 110 to provide a beam from an in-ground mounted fixture that is vertical. At the other extreme, with lamp assembly 50 positioned so that the pivot axis is off-center, moving in a direction away from edge 113, the lamp will be tilted at a shallow angle to pass through lens 110 to create a nearly horizontal beam.

In an exemplary embodiment, the linear movement of lamp assembly 50 along slot 129, in cooperation with the near 180 degree pivotal rotation of the lamp assembly about the axis created by its union with support brackets 122, 124 and the diagonal movement along slot 127 provides a three axis gimble which provides maximum aiming flexibility, with a range from nearly horizontal to vertical.

The following procedure is followed to adjust the in-ground lighting fixture to achieve variable directionability of the light: screws 118 are rotated in a counter-clockwise direction which loosens the tension exerted by the screws against mounting ring 104, allowing the user to remove bezel 106 from the top of housing 102 which is recessed into the ground 90. The user may then turn bezel 106 over to expose the lamp assembly 50 which is attached by support brackets 122, 124 to the underside of the bezel. To perform a simple repositioning of brackets 122, 124, the user first loosens the four screws 138 (two for each bracket) from their secure seat within threaded bores 139. With screws 138 loosened, the user can reposition the brackets (and the attached lamp assembly) at any position along the linear pathway parallel to the long sides of window opening 112. Once the desired position is achieved, screws 138 can be tightened to secure their seat within threaded bores 139, fixing support brackets 122, 124 in place.

If the position of lamp assembly 50 has been significantly modified, its tilt should be adjusted to ensure that the maximum amount of light is directed out of lens 110. The angle of lamp assembly can be changed by rotating lamp assembly 50 along the pivot axis formed by screws 126, 128. Further adjustment can be obtained by loosening screws 126, 128, allowing lamp assembly 50 to be moved closer to or away from lens 110 by sliding screws 126, 128 within slot 127. Taken together, the user has the capability of a threefold directional adjustment, providing for illumination of virtually any landscaping configuration.

After completion of the adjustment of the position of lamp assembly 50, bezel 106 is replaced on top of housing 102 and screws 118 are reinserted to lock bezel 106 in place.

The in-ground lighting fixture of the present invention offers wide directional variability with the entire fixture designed and adapted for in-ground or underwater use. The fixture construction provides a multitude of barriers against the intrusion of water while taking into consideration other unique problems often encountered with in-ground fixtures, such as heat build-up within the interior of the fixture and lenses being fouled by pooling water, dirt and debris. The configuration of the present invention is aesthetically pleasing and is constructed with a focus on simplicity of use and durability of construction.

Other embodiments and modifications of the present invention may occur to those of ordinary skill in the art in view of these teachings. Therefore, this invention is to be limited only by the following claims which include all other such embodiments and modifications when viewed in conjunction with the above specifications and accompanying drawings.

What is claimed:

1. A lighting fixture, comprising:
   a hollow housing having an upper end and a lower end;
   a bezel having an upper portion and a lower portion removably disposed on the upper end of the housing, the bezel having a window for transmitting light therethrough and a plurality of openings formed therein for circulation between an interior and an exterior of the housing;
   at least one lamp support bracket extending downward from the bezel, the at least one bracket having a first end and a second end, the first end being slidably attached to the lower portion of the bezel;
   a lamp assembly comprising a watertight lamp enclosure with a lens, a lamp, a reflector and a socket enclosed within the lamp enclosure, and a watertight connector, the lamp enclosure comprising a shroud and a base, the shroud having a lens end within which the lens is retained with a watertight sealant, wherein the lamp enclosure is pivotably and slidably attached to the second end of the at least one bracket.

2. The lighting fixture of claim 1, wherein the base has a plurality of cooling fins extending therefrom.

3. The lighting fixture of claim 1, wherein an interior space within the based is filled with potting material.

4. The lighting fixture of claim 1, further comprising a mounting ring attached to the upper portion of the housing.

5. The lighting fixture of claim 1, wherein the window comprises a transparent plate and the bezel comprises a slot for retaining the transparent plate at a shallow angle relative to horizontal for providing water drainage from an upper surface of the transparent plate toward an outer edge of the bezel.

6. The lighting fixture of claim 1, wherein the bezel is formed from brass.

7. The lighting fixture of claim 1, wherein the lamp enclosure is formed from aluminum alloy.

8. The lighting fixture of claim 1, wherein the housing is a hollow cylinder.

9. The lighting fixture of claim 8, wherein the housing is formed from plastic pipe.

10. The lighting fixture of claim 1, wherein the shroud has a base opposite the lens end, the base end having an internal thread disposed therein, and wherein the base has an upper portion with an external thread adapted for mating with the internal thread of the shroud portion, and first and second O-ring seats disposed near the external thread, and the lamp enclosure further comprises:
    a first O-ring adapted to fit within the first O-ring seat and having dimensions for contacting an inner surface of the base end of the shroud to create a watertight seal; and
    a second O-ring adapted to fit within the second O-ring seat and having dimensions for prevent dirt from entering the lamp enclosure.

11. The lighting fixture of claim 10, wherein the second O-ring is smaller than the first O-ring.

12. The lighting fixture of claim 10, wherein the external thread and the internal thread are each ACME-type threads.

13. A lighting fixture, comprising:
    a hollow housing having an upper end and a lower end;
    a bezel having an upper portion and a lower portion removably disposed on the upper end of the housing, the bezel having a window opening and a drain opening;
    a window retained within the window opening for transmitting light therethrough, wherein the window is disposed at a shallow angle relative to horizontal to allow water to drain through the drain opening;
    at least one lamp support bracket extending downward from the bezel, the at least one bracket having a first end and a second end, the first end being attached to the lower portion of the bezel;
    a lamp assembly comprising a lamp enclosure, a lamp, a reflector and a socket, the lamp assembly being attached to the second end of the at least one bracket, wherein the lamp enclosure comprises:
       a shroud having a lens end and a base end, the base end having an internal thread disposed therein;
       a lens disposed within the lens end of the shroud and sealed with a watertight sealant;
       a base having an upper portion and a lower portion, the upper portion having an external thread adapted for mating with the internal thread of the shroud, and first and second O-ring seats;
       a first O-ring adapted to fit within the first O-ring seat and having dimensions for contacting an inner surface of the base end of the shroud to create a watertight seal;
       a second O-ring adapted to fit within the second O-ring seat and having dimensions for preventing dirt from entering the lamp enclosure; and
       a watertight connector for passing electrical wires into the lamp enclosure.

14. The lighting fixture of claim 13, wherein the at least one bracket is slidably attached to the lower portion of the bezel; and
    the lamp assembly is pivotably and slidably attached to the second end of the at least one bracket to provide a three axis gimble.

15. The lighting fixture of claim 13, wherein the drain opening is near an outer edge of the bezel.

16. The lighting fixture of claim 13, wherein the base is has a plurality of cooling fins extending therefrom.

17. The lighting fixture of claim 13, wherein the second O-ring is smaller than the first O-ring.

18. The lighting fixture of claim 13, wherein an interior space within the base is filled with potting material.

19. The lighting fixture of claim 13, wherein the external thread and the internal thread are each ACME-type threads.

20. The lighting fixture of claim 13, further comprising a mounting ring attached to the upper portion of the housing.

21. The lighting fixture of claim 13, wherein the bezel is formed from brass.

22. The lighting fixture of claim 13, wherein the bezel has a plurality of openings formed therein for providing air circulation.

23. The lighting fixture of claim 13, wherein the lamp enclosure is formed from aluminum alloy.

* * * * *